US008283403B2

(12) United States Patent
Mao et al.

(10) Patent No.: US 8,283,403 B2
(45) Date of Patent: Oct. 9, 2012

(54) CARBON NANOTUBE-REINFORCED NANOCOMPOSITES

(75) Inventors: Dongsheng Mao, Austin, TX (US); Zvi Yaniv, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 0 days.

(21) Appl. No.: 12/180,359

(22) Filed: Jul. 25, 2008

(65) Prior Publication Data

US 2009/0035570 A1   Feb. 5, 2009

Related U.S. Application Data

(63) Continuation-in-part of application No. 11/757,272, filed on Jun. 1, 2007, and a continuation-in-part of application No. 11/693,454, filed on Mar. 29, 2007, and a continuation-in-part of application No. 11/695,877, filed on Apr. 3, 2007.

(60) Provisional application No. 60/819,319, filed on Jul. 7, 2006, provisional application No. 60/810,394, filed on Jun. 2, 2006, provisional application No. 60/788,234, filed on Mar. 31, 2006, provisional application No. 60/789,300, filed on Apr. 5, 2006.

(51) Int. Cl.
  C08K 7/02    (2006.01)
  C08K 3/04    (2006.01)
(52) U.S. Cl. ................ 524/496; 524/495; 977/752
(58) Field of Classification Search ............... 524/440, 524/495, 496; 977/752
   See application file for complete search history.

(56) References Cited

U.S. PATENT DOCUMENTS

| 5,096,556 | A | 3/1992 | Corrigan et al. |
| 5,565,505 | A | 10/1996 | Papalos et al. |
| 5,565,506 | A | 10/1996 | Papalos et al. |
| 5,569,715 | A | 10/1996 | Grandhee |
| 5,604,269 | A | 2/1997 | Papalos et al. |
| 5,623,046 | A | 4/1997 | Papalos et al. |
| 5,652,323 | A | 7/1997 | Papalos et al. |

(Continued)

FOREIGN PATENT DOCUMENTS

JP   57011017   1/1982

(Continued)

OTHER PUBLICATIONS

Gonjny, F. H., et al., "Carbon nanotube-reinforced epoxy-composites: enhanced stiffness and fracture toughness at low nanotube content," *Composites Science and Technology*, vol. 64, Issue 15. Developments in carbon nanotube and nanofibre reinforced polymers, Nov. 2004, pp. 2363-2371. [Available Online May 14, 2004: <URL: http://www.sciencedirect.com/science/article/B6TWT-4CCNVPM-3/1/a94fb14dbf527a3eaea578dde0b0cad4>].

(Continued)

*Primary Examiner* — Ling Choi
*Assistant Examiner* — Darcy D Laclair
(74) *Attorney, Agent, or Firm* — Kelly Kordzik; Matheson Keys Garsson & Kordzik PLLC

(57) ABSTRACT

Carbon nanotubes (CNTs) are so long that they cannot be penetrated inbetween carbon fibers during a prepreg preparation process, and are shortened in order for them not to be filtered out by the carbon fibers. This results in a huge improvement of the mechanical properties (flexural strength and flexural modulus) compared with neat epoxy.

14 Claims, 7 Drawing Sheets

U.S. PATENT DOCUMENTS

| | | | |
|---|---|---|---|
| 5,719,210 | A | 2/1998 | Arora et al. |
| 5,750,595 | A | 5/1998 | Arora et al. |
| 5,760,108 | A | 6/1998 | Arora et al. |
| 5,763,506 | A | 6/1998 | Papalos et al. |
| 5,786,420 | A | 7/1998 | Grandhee |
| 5,854,313 | A | 12/1998 | Omori et al. |
| 5,969,030 | A | 10/1999 | Grandhee |
| 6,066,448 | A | 5/2000 | Wohlstadter et al. |
| 6,090,545 | A | 7/2000 | Wohlstadter et al. |
| 6,140,045 | A | 10/2000 | Wohlstadter et al. |
| 6,294,596 | B1 | 9/2001 | Papalos et al. |
| 6,303,672 | B1 | 10/2001 | Papalos et al. |
| 6,333,016 | B1 | 12/2001 | Resasco et al. |
| 6,524,777 | B1 | 2/2003 | Whitesides et al. |
| 6,627,689 | B2 * | 9/2003 | Iino et al. .................. 524/404 |
| 6,689,835 | B2 | 2/2004 | Amarasekera et al. |
| 6,702,969 | B2 | 3/2004 | Matuana et al. |
| 6,770,583 | B2 | 8/2004 | Keller |
| 6,800,946 | B2 | 10/2004 | Chason et al. |
| 6,846,345 | B1 | 1/2005 | Keller et al. |
| 6,962,892 | B2 | 11/2005 | Resasco et al. |
| 6,971,391 | B1 | 12/2005 | Wang et al. |
| 6,986,853 | B2 | 1/2006 | Glatkowski et al. |
| 6,994,907 | B2 | 2/2006 | Resasco et al. |
| 7,005,550 | B1 | 2/2006 | Tan et al. |
| 7,073,201 | B2 | 7/2006 | Sunada et al. |
| 7,074,310 | B2 | 7/2006 | Smalley et al. |
| 7,078,683 | B2 | 7/2006 | Joyce |
| 7,094,367 | B1 | 8/2006 | Harmon et al. |
| 7,094,386 | B2 | 8/2006 | Resasco et al. |
| 7,138,444 | B2 | 11/2006 | McGee et al. |
| 7,153,903 | B1 | 12/2006 | Barraza et al. |
| 7,162,302 | B2 | 1/2007 | Wang et al. |
| 2002/0150524 | A1 | 10/2002 | Smalley et al. |
| 2003/0027357 | A1 * | 2/2003 | Sigal et al. .................. 436/518 |
| 2003/0099798 | A1 | 5/2003 | George et al. |
| 2003/0151030 | A1 | 8/2003 | Gurin |
| 2004/0077771 | A1 * | 4/2004 | Wadahara et al. ............ 524/495 |
| 2004/0089851 | A1 | 5/2004 | Wang et al. |
| 2005/0008560 | A1 | 1/2005 | Kataoka et al. |
| 2005/0127329 | A1 | 6/2005 | Wang et al. |
| 2005/0191491 | A1 | 9/2005 | Wang et al. |
| 2005/0229328 | A1 | 10/2005 | Tran |
| 2006/0041104 | A1 | 2/2006 | Ait-Haddou et al. |
| 2006/0267235 | A1 * | 11/2006 | Ma et al. ..................... 264/105 |
| 2006/0270790 | A1 | 11/2006 | Comeau |
| 2007/0004857 | A1 | 1/2007 | Barraza et al. |
| 2007/0023839 | A1 * | 2/2007 | Furukawa et al. ............ 257/353 |
| 2007/0183959 | A1 | 8/2007 | Charlier et al. |
| 2007/0276077 | A1 | 11/2007 | Mao et al. |
| 2008/0152913 | A1 | 6/2008 | Shinbach et al. |
| 2010/0158193 | A1 | 6/2010 | Bates |

FOREIGN PATENT DOCUMENTS

| | | |
|---|---|---|
| JP | 2003238816 | 8/2003 |
| JP | 2003306607 | 10/2003 |
| JP | 2004124086 | 4/2004 |
| JP | 2004221071 | 8/2004 |
| JP | 2005082832 | 3/2005 |
| JP | 2005520873 | 7/2005 |
| JP | 2005255710 | 9/2005 |
| JP | 2006188389 | 7/2006 |
| JP | 2006527786 | 12/2006 |
| JP | 2007502246 | 2/2007 |
| WO | WO 2004/001107 | 12/2003 |
| WO | WO 2005/012171 | 2/2005 |
| WO | WO 2005028174 A2 * | 3/2005 |
| WO | WO 2005/036563 | 4/2005 |
| WO | 2006/104689 | 10/2006 |

OTHER PUBLICATIONS

Gonjny, F. H., et al., "Surface modified multi-walled carbon nanotubes in CNT/epoxy-composites." Chemical Physics Letters, vol. 370, Issues 5-6, pp. 820-824. Mar. 21, 2003. [Available Online: <URL: http://www.sciencedirect.com/science/article/B6TFN-47YYBXN-7/1/b20ce49d3a5e19180f2b6a86e4159f14>].

Lam, Chun-ki et al.; Effect of Ultrasound Sonication in Nanoclay Clusters of Nanoclay/Epoxy Composites; *Materials Letters*; vol. 59, pp. 1369-1372, Jan. 18, 2005.

Fornes, T.D. et al.; Nylon-6 Nanocomposites from Alkylammonium-Modified Clay: The Role of Alkyl Tails on Exfoliation; *Macromolecules*; vol. 37, No. 5, pp. 1793-1798, Jan. 29, 2004.

Mhetre, Shamal K. et al.; Nanocomposites with Functionalized Carbon Nanotubes; *Mat. Res. Soc. Symp. Proc.*; vol. 788, pp. L11.17.1-L11.17.6, 2004.

International Search Report and Written Opinion from the International Searching Authority for PCT/US07/65630 filed Mar. 30, 2007, mailed Jun. 16, 2008, 11 pages.

Iijima, S., "Helical microtubules of graphitic carbon," *Nature* vol. 354, pp. 56-58 (Nov. 7, 1991). Published by Nature Publishing Group, New York, NY, USA. [Online], [Retrieved on Apr. 3, 2006]. Retrieved from the Internet: <URL: http://www.nature.com/nature/journal/v354/n6348/abs/354056a0.html>.

Wong, E., et al., "Nanobeam Mechanics: Elasticity, Strength, and Toughness of Nanorods and Nanotubes," *Science* vol. 277, pp. 1971-1975 (Sep. 26, 1977).

Cho. J.W. et al.; Nylon 6 Nanocomposites by Melt Compounding; *Polymer*; vol. 42, 2001, pp. 1083-1094, Feb. 24, 2000.

Ratna. D et al.; Clay-reinforced Epoxy Nanocomposites; *Polymer International*; vol. 52, 2003, pp. 1403-1407, 2003.

Salahuddin, N. et al.; Nanoscale Highly Filled Epoxy Nanocomposite; *European Polymer Journal*; vol. 38, pp. 1477-1482, May 8, 2000.

Zhang, Kailiang et al.; Preparation and Characterization of Modified-Clay-Reinforced and Toughened Epoxy-Resin Nanocomposites; *Journal of Applied Polymer Science*; vol. 91, 2004, pp. 2649-2652, Jan. 24, 2003.

Thostenson et al.; Carbon Nanotube/Carbon Fiber Hybrid Multiscale Composites: Journal of Applied Physics; vol. 91, No. 9, May 1, 2002.

International Search Report and Written Opinion from the International Searching Authority for PCT/US08/78306 filed Sep. 30, 2009, mailed May 17, 2009, 5 pages.

The State Intellectual Property Office of the People's Republic of China, Notice on the First Office Action, Application No. 200780017502.3, Jul. 1, 2011.

The State Intellectual Property Office of the People's Republic of China, Notice on the First Office Action, Application No. 200780015723.7, Apr. 6, 2011.

International Searching Authority, International Preliminary Report on Patentability and Written Opinion, International Application No. PCT/US2010/026012, Sep. 13, 2011.

International Search Report and Written Opinion from the International Searching Authority, PCT/US11/44298, mailed Dec. 6, 2011, 7 pages.

Notice of Reasons for Rejection, Japanese Patent Application No. 2009-503306, Feb. 28, 2012.

Notice of Reasons for Rejection, Japanese Patent Application No. 2009-504437, Feb. 7, 2012.

Supplementary European Search Report, Application No. 07759819.1, dated Aug. 5, 2009, 3 pages.

Georgakilas et al., "Organic Derivatization of Single-Walled Carbon Nanotubes by Claims and Intercalated Derivatives," Carbon, vol. 42, 2004, pp. 865-870.

www.microfluidicscorp.com/images/stories/pdf/hc.pdf, Microfluidics (1998).

International Search Report and Written Opinion from the International Searching Authority, PCT/US07/65923, mailed Jun. 6, 2008, 9 pages.

Derwent Acc No. 1982-16395E (1982) Abstract for Ishikawa, K., Sugimoto, H., and Yamamoto, T., Publications JP 57011017 and JP 83046245.

Machine Translation of JP 2005082832.

European Office Action, Application No. 07759819.1, dated Oct. 8, 2009.

Gojny et al., "Influence of different carbon nanotubes on the mechanical properties of epoxy matrix composites—A comparative study," Composites Science and Technology; Apr. 21, 2005. Available online at www.sciencedirect.com.

Zhu et al., "Improving the Dispersion and Integration of Single-Walled Carbon Nanotubes in Epoxy Composites through Functionalization," Nano Letters, Jun. 26, 2003, vol. 3, No. 8, pp. 1107-1113.

Fornes et al., "Structure and Properties of Nanocomposites Based on Nylon-11 and -12 Compared with Those Based on Nylon-6," Macromolecules; Jun. 22, 2004, 37, pp. 7698-7709.

International Search Report and Written Opinion from the International Searching Authority, PCT/US10/26012, mailed May 11, 2010, 7 pages.

International Searching Authority, International Preliminary Report on Patentability, International Application No. PCT/US2008/078306, mailed Feb. 3, 2011.

* cited by examiner

CARBON NANOTUBE-REINFORCED NANOCOMPOSITES

This application is a continuation-in-part of U.S. patent application Ser. No. 11/757,272, which claims priority to U.S. Provisional Patent Application Ser. Nos. 60/819,319 and 60/810,394, all of which are hereby incorporated by reference herein. This application is a continuation-in-part of U.S. patent application Ser. No. 11/693,454, which claims priority to U.S. Provisional Application Ser. Nos. 60/788,234 and 60/810,394, all of which are hereby incorporated by reference herein. This application is a continuation-in-part of U.S. patent application Ser. No. 11/695,877, which claims priority to U.S. Provisional Application Ser. Nos. 60/789,300 and 60/810,394, all of which are hereby incorporated by reference herein.

BACKGROUND

Since the first observation in 1991, carbon nanotubes (CNTs) have been the focus of considerable research (S. Iijima, "Helical microtubules of graphitic carbon," Nature 354, 56 (1991)). Many investigators have reported the remarkable physical and mechanical properties of this new form of carbon. CNTs typically are 0.5-1.5 nm in diameter for single wall CNTs (SWNTs), 1-3 nm in diameter for double wall CNTs (DWNTs), and 5 nm to 100 nm in diameter for multi-wall CNTs (MWNTs). From unique electronic properties and a thermal conductivity higher than that of diamond to mechanical properties where the stiffness, strength and resilience exceeds that of any current material, CNTs offer tremendous opportunity for the development of fundamental new material systems. In particular, the exceptional mechanical properties of CNTs ($E > 1.0$ TPa and tensile strength of 50 GPa) combined with their low density (1-2.0 $g/cm^3$) make them attractive for the development of CNT-reinforced composite materials (Eric W. Wong, Paul E. Sheehan, Charles M. Lieber, "Nanobeam Mechanics: Elasticity, Strength, and Toughness of Nanorods and Nanotubes," Science 277, 1971 (1997)). CNTs are the strongest material known on earth. Compared with MWNTs, SWNTs and DWNTs are even more promising as reinforcing materials for composites because of their higher surface area and higher aspect ratio. Table 1 lists surface areas and aspect ratios of SWNTs, DWNTs, and MWNTs.

TABLE 1

|  | SWNTs | DWNTs | MWNTs |
| --- | --- | --- | --- |
| Surface area ($m^2/g$) | 300-600 | 300-400 | 40-300 |
| Geometric aspect ratio (length/diameter) | ~10,000 | ~5,000 | 100~1000 |

A problem is that CNTs are usually pretty long (from several microns to over 100 μm) when they are grown, which makes it difficult for them to be penetrated into a matrix in fiber reinforced plastics (FRP) because the distance between the nearest fibers is so small. For instance, for a unidirectional carbon fiber or fabric reinforced epoxy composite, the content of the carbon fibers is around 60 percent by volume so that the gap between the nearest carbon fibers is around 1 micron (assuming the carbon fiber has a diameter of 7-8 μm with a density of around 1.75-1.80 $g/cm^3$ and the epoxy matrix has a density of 1.2 $g/cm^3$). The same is true for glass fibers and other types of fibers used to make composites. CNTs may reinforce the polymer resin to improve mechanical properties such as strength and modulus, however they cannot reinforce the FRP because they are filtered out by the fibers during the FRP preparation.

DETAILED DESCRIPTION

CNTs as short as or shorter than 2 μm can be penetrated inbetween the fibers and therefore significantly improve the mechanical properties of the FRP.

In one embodiment of the present invention, a detailed example of this embodiment is given in an effort to better illustrate the invention.

Epoxy, SWNTs, DWNTs, MWNTs, and Hardener

Figure 2:
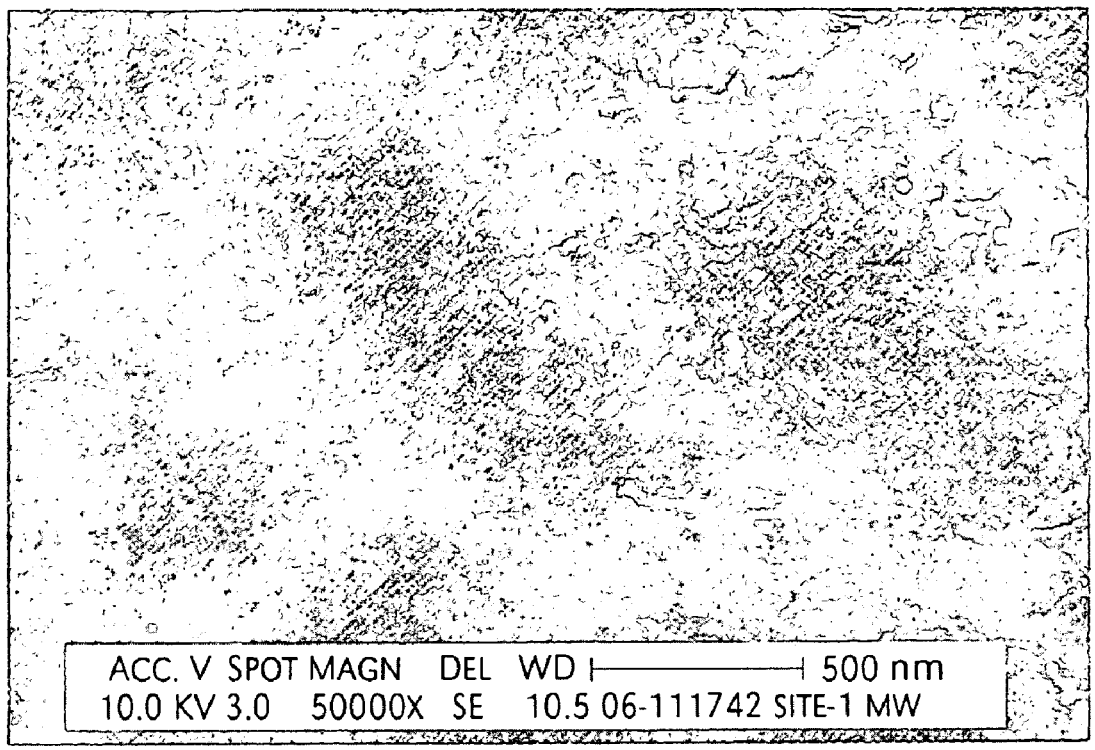
FIG. 2 shows a SEM digital image of MWNTs.

Epoxy resin (bisphenol-A) was obtained from Arisawa Inc., Japan. The hardener (dicyandiamide) was obtained from the same company, which was used to cure the epoxy nanocomposites. SWNTs, DWNTs and MWNTs were obtained from Nanocyl, Inc., Belgium. The CNTs may be purified to >90% carbon content. However, pristine CNTs or functionalized by functional groups such as carboxylic and amino-functional groups may also work. The length of the CNTs may be around 5-20 μm. FIG. 2 shows a digital image of an SEM of the MWNTs. Except for the epoxy, other thermosets such as polyimide, phenolics, cyanate esters, and bismaleimides or thermal plastics such as nylon may also work.

Figure 1:
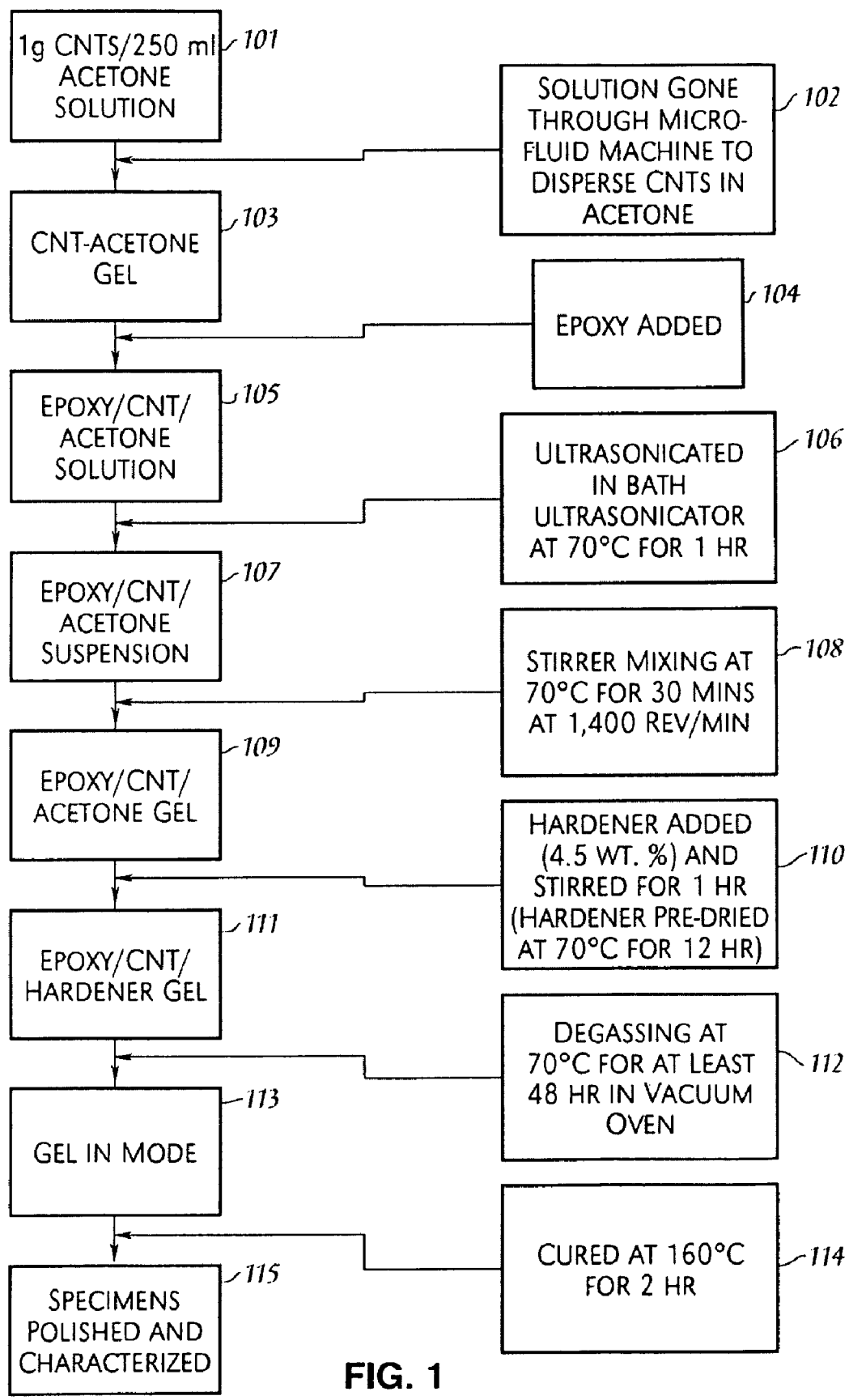
FIG. 1 illustrates a process for manufacturing Nanocomposites in accordance with an embodiment of the present invention.

FIG. 1 illustrates a schematic diagram of a process flow to make epoxy/CNT Nanocomposites in accordance with an embodiment of the present invention. All ingredients may be dried in a vacuum oven at 70° C. for 16 hours to eliminate moisture. The loading of the CNTs may be 1.0 wt. % for each of the resins. CNTs are placed in acetone 101 and dispersed by a micro-fluidic machine in step 102 (commercially available from Microfluidics Co., model no. Y110). The micro-fluidic machine uses high-pressure streams that collide at ultra-high velocities in precisely defined micron-sized channels. Its combined forces of shear and impact act upon products to create uniform dispersions. The CNT/acetone then forms as a gel 103 resulting in the CNTs well dispersed in the acetone solvent. However, other methods, such as an ultra-sonication process or a high shear mixing process may also be used. A surfactant may be also used to disperse CNTs in solution. Epoxy is then added in step 104 to the CNT/acetone gel to create an epoxy/CNT/acetone solution 105, which is followed by an ultra-sonication process in a bath at 70° C. for 1 hour (step 106) to create an epoxy/CNT/acetone suspension 107. The CNTs may be further dispersed in epoxy in step 108 using a stirrer mixing process at 70° C. for half an hour at a speed of 1,400 rev/min. to create an epoxy/CNT/acetone gel 109. A hardener is than added in step 110 to the epoxy/CNT/acetone gel 109 at a ratio of 4.5 wt. % followed by stirring at 70° C. for 1 hour. The resulting gel 111 may then be degassed in step 112 in a vacuum oven at 70° C. for 48 hours. The material 113 may then be cured at 160° C. for 2 hours. In order to test the material 113, it may then be poured into a Teflon mold so that the mechanical properties (flexural strength and flexural modulus) of the specimens are characterized after a polishing process 115.

The above resin (epoxy/CNT/hardener) after being degassed at 70° C. for 48 hours may be also used to make a FRP using a hot-melt process. Carbon fiber (obtained from Toray Industries, Inc., model no. T700-12k) may be used for prepreg preparation. "Prepreg" (or, "pre-preg") is a term known in the art for "pre-impregnated" composite fibers. These may take the form of a weave or are unidirectional. They contain an amount of the matrix material used to bond them together and to other components during manufacture. The pre-preg may be stored in cooled areas since activation is most commonly done by heat. Hence, composite structures build of pre-pregs will mostly require an oven or autoclave to cure out.

The CNT-reinforced epoxy resin is first coated onto a releasing paper. The prepreg is then obtained by impregnating unidirectional carbon fibers with CNT-reinforced epoxy resin thin film. The volume of the carbon fiber was controlled at 60%. The prepreg had an area weight of 180 g/m$^2$.

Mechanical Properties of the Nanocomposites

Table 2 shows mechanical properties (flexural strength and flexural modulus) of the CNT-reinforced epoxy and also with the reinforcement of the unidirectional carbon fibers. It can be seen, in resin form, a huge improvement of the mechanical properties (each has over 30% improvement of the flexural strength and at least 10% improvement of the flexural modulus) compared with neat epoxy. However, in the Carbon Fiber Reinforced Polymer (CFRP) form, both properties did not improve for the CNT-reinforced CFRP compared with the neat epoxy CFRP.

TABLE 2

| Sample | Mechanical properties of the resin | | Mechanical properties of the CFRP | |
|---|---|---|---|---|
| | Flexural strength (MPa) | Flexural modulus (GPa) | Flexural strength (MPa) | Flexural modulus (GPa) |
| Neat epoxy | 116 | 3.18 | 1394 | 62.3 |
| Epoxy/MWNTs (1.0 wt. %) | 149 | 3.54 | 1388 | 61.5 |
| Epoxy/DWNTs (1.0 wt. %) | 159 | 3.69 | 1354 | 61.7 |
| Epoxy/SWNTs (1.0 wt. %) | 164 | 3.78 | 1408 | 62.8 |

Figure 3A:
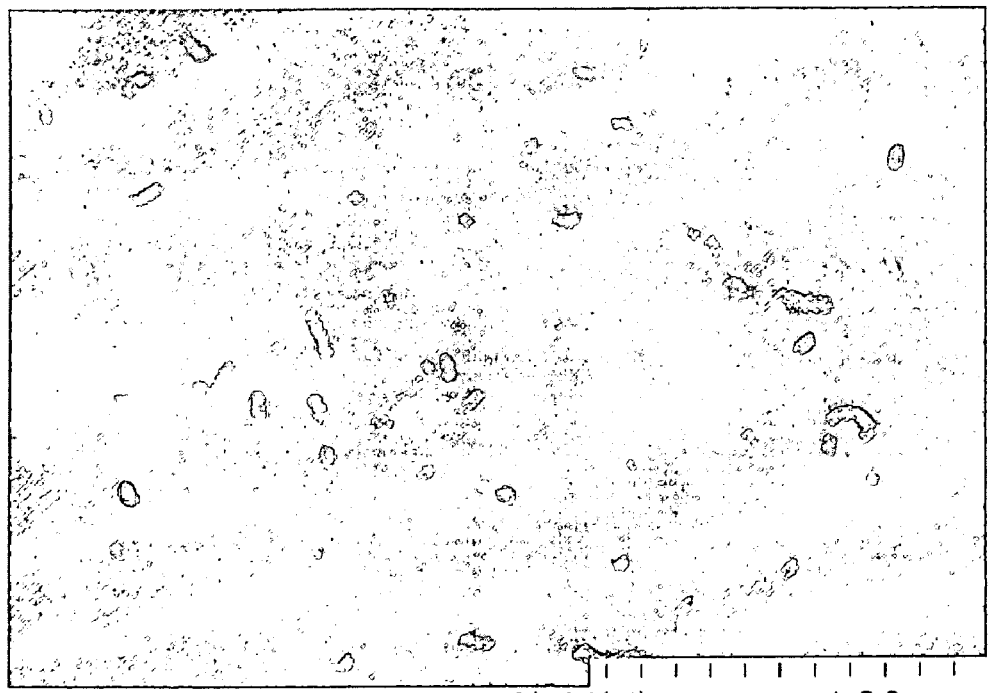
FIGS. 3A-3C show SEM digital images of fracture surfaces of a MWNT-reinforced epoxy, DWNT-reinforced epoxy, and SWNT-reinforced epoxy, respectively.
Figure 3B:
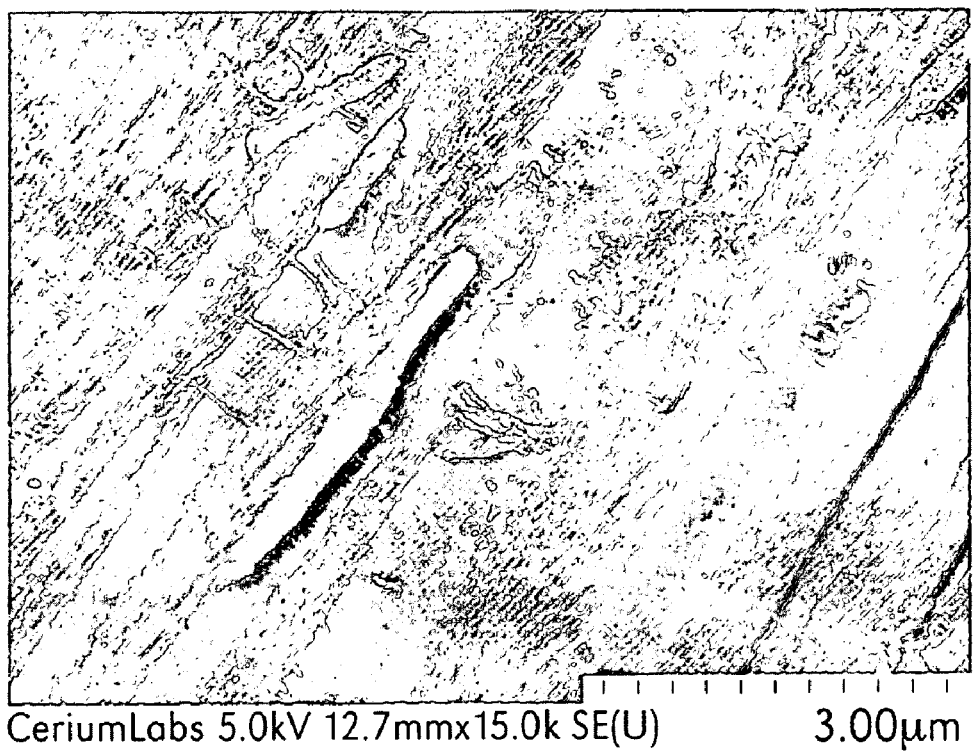
Figure 3C:
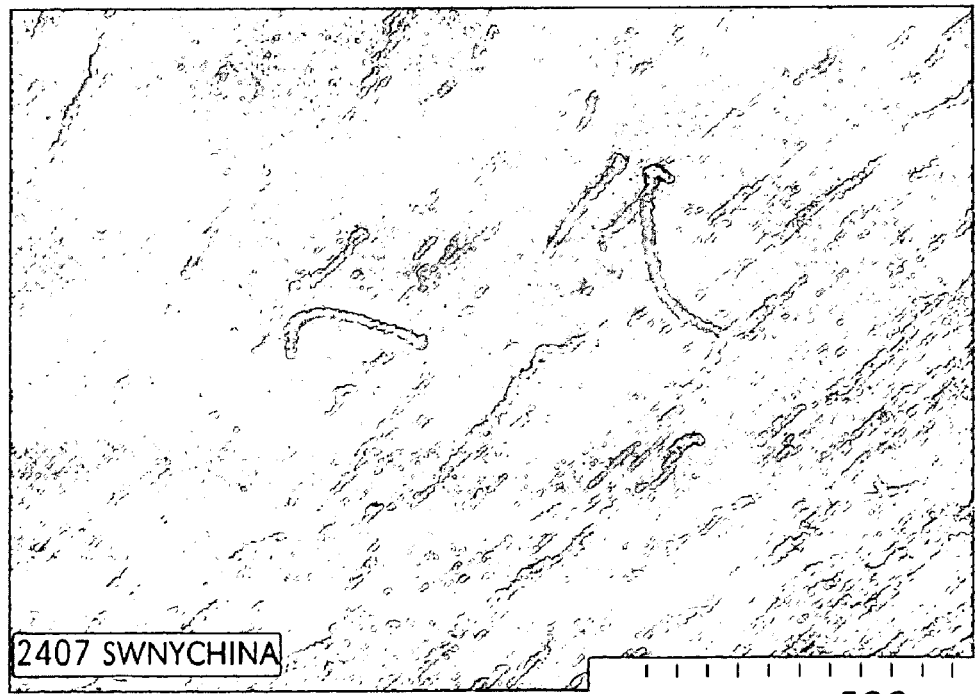
Figure 4A:
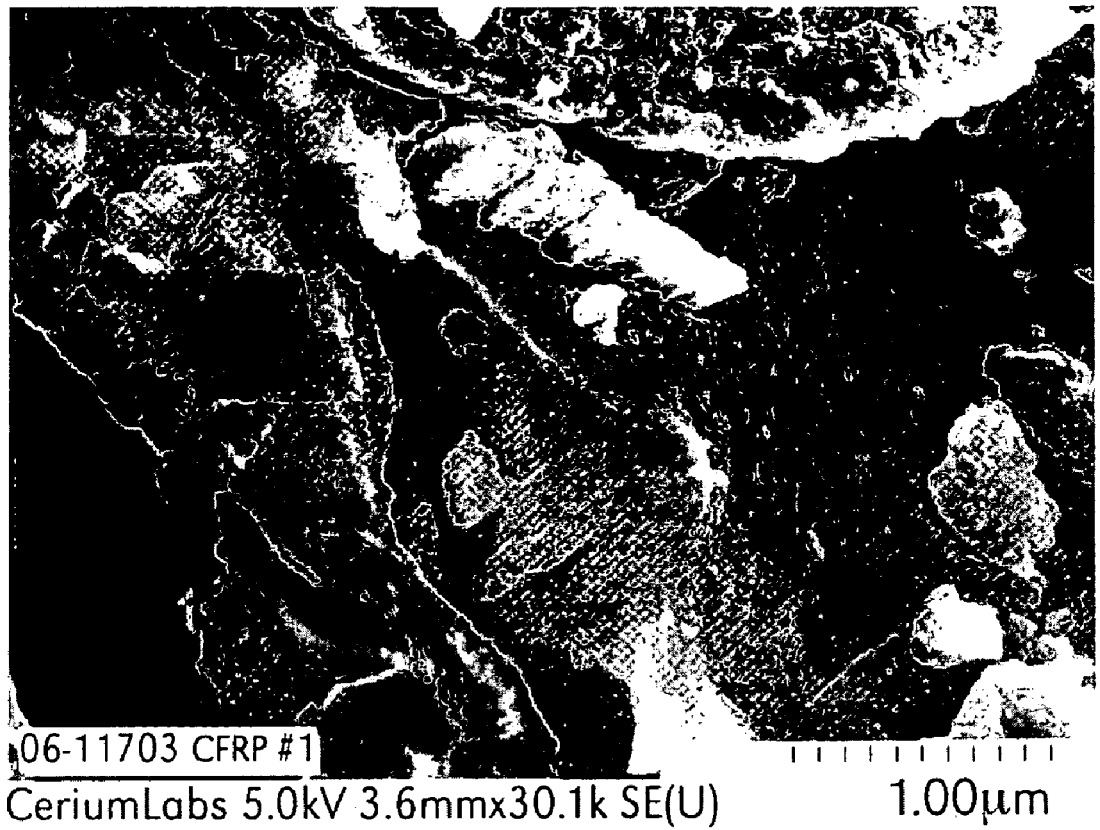
FIG. 4A shows a SEM digital image of a fracture surface of a DWNT-reinforced CFRP showing no DWNTs were penetrated inbetween carbon fibers.
Figure 4B:
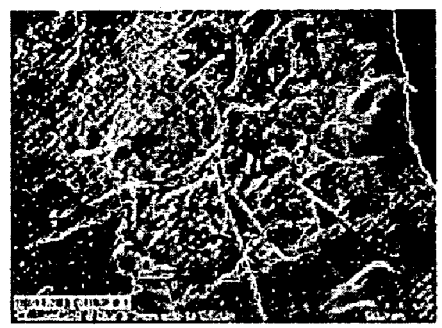
FIG. 4B shows a SEM digital image of a fracture surface of a DWNT-reinforced CFRP showing DWNTs were filtered out to an end layer of prepreg.

Scanning electron microscopy (SEM) may then be used to check the dispersion of the CNTs in both the resin and the CFRP samples. In the resin form, all the CNT-reinforced epoxy samples showed very good dispersion of CNTs (see FIGS. 3A-3C). However, the CNTs were filtered out to the end layer of the prepreg by the unidirectional carbon fibers (see FIGS. 4A-4B for DWNT-reinforced epoxy CFRP). That is because the CNTs are so long that they cannot be penetrated inbetween the carbon fibers because the gap for the nearest carbon fibers is only around 1 μm. That is the reason why the reinforcement of CNTs in resin did not transfer to the CFRP.

Shortening of the CNTs and Reinforcement of Epoxy Resin and CFRP

Figures 5A, 5B:
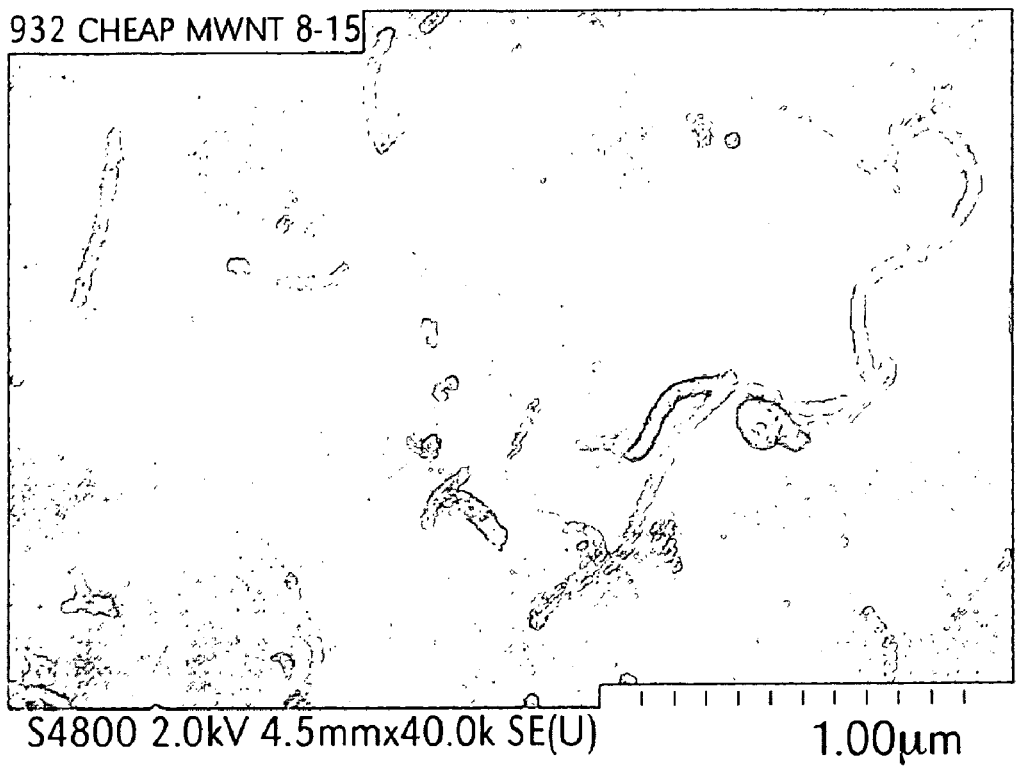
FIGS. 5A-5C show SEM digital images of shortened MWNTs, DWNTs, and SWNTs, respectively.
Figure 5C:
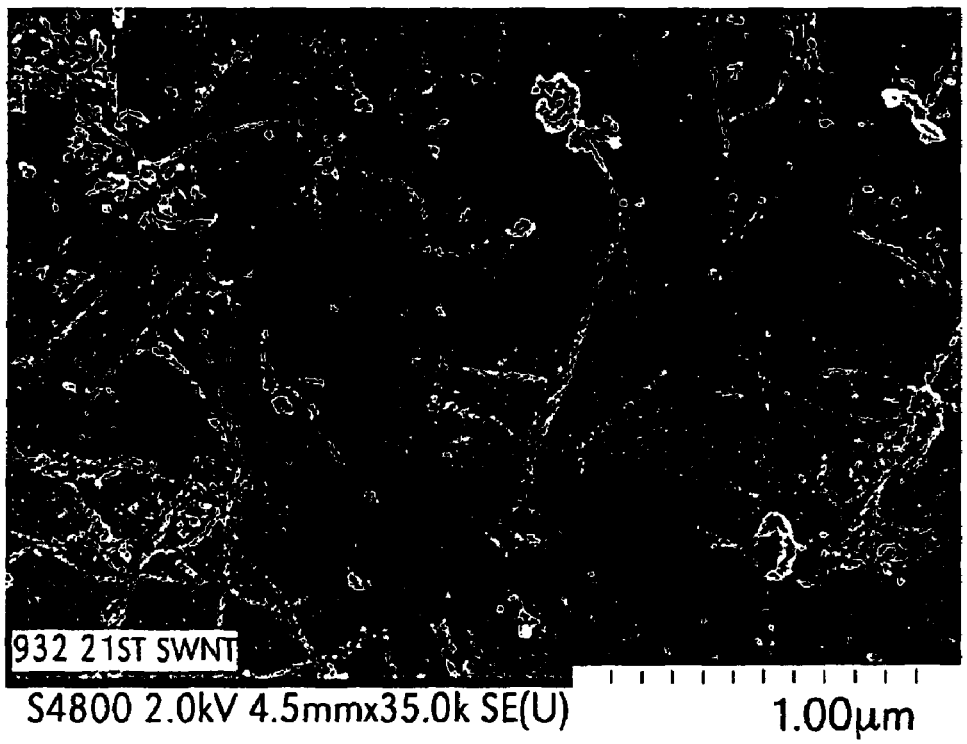

Because the CNTs are so long that they cannot be penetrated inbetween the carbon fibers during the prepreg preparation process, they need to be shortened in order for them not to be filtered out by the carbon fibers. The MWNTs, DWNTs, and SWNTs may be mixed with a concentrated acid mixture (HNO3:H2SO4=3:1) and stirred for 4 hours at 120° C. The CNTs are filtered using filter paper (polycarbonate filter paper with 2 micron open to filter out the acid). The CNTs may then be washed with ionized water 4-5 times and dried in vacuum over 50° C. for 12 hours. FIGS. 5A-5C show SEM images of MWNTs, DWNTs, mid SWNTs, respectively, shortened to less than 2 μm length.

Table 3 shows mechanical properties (flexural strength and flexural modulus) of the shortened CNT-reinforced epoxy and also with the reinforcement of the unidirectional carbon fibers. It can be seen in resin form a huge improvement of the mechanical properties (each has over 30% improvement of the flexural strength and at least 10% improvement of the flexural modulus) compared with the neat epoxy, which is similar as the long CNT-reinforced epoxy resin mentioned above. In the CFRP form, both properties improved compared with the neat epoxy CFRP. For example, flexural strength of the SWNT-reinforced CFRP improved 17% compared with that of the neat epoxy CFRP.

TABLE 3

| Sample | Mechanical properties of the resin | | Mechanical properties of the CFRP | |
|---|---|---|---|---|
| | Flexural strength (MPa) | Flexural modulus (GPa) | Flexural strength (MPa) | Flexural modulus (GPa) |
| Neat epoxy | 116 | 3.18 | 1394 | 62.3 |
| Epoxy/MWNTs (1.0 wt. %) | 150 | 3.60 | 1561 | 65.4 |
| Epoxy/DWNTs (1.0 wt. %) | 160 | 3.65 | 1603 | 67.3 |
| Epoxy/SWNTs (1.0 wt. %) | 162 | 3.70 | 1630 | 70.8 |

Figure 6A:
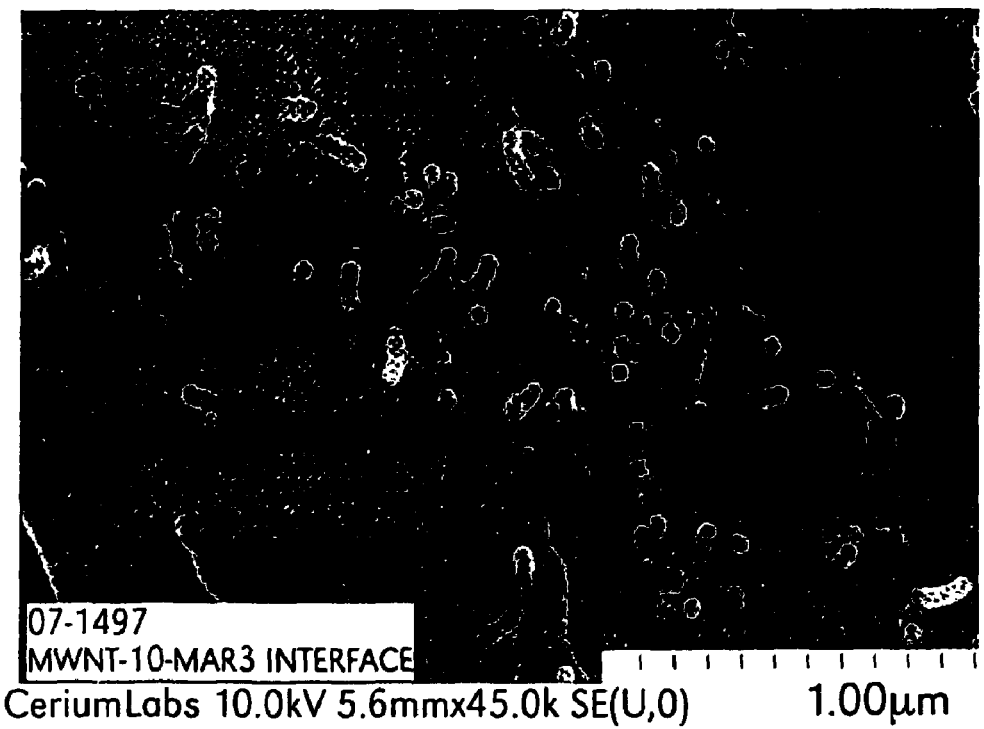
FIGS. 6A-6C show SEM digital images of fracture surfaces of a MWNT-reinforced CFRP, DWNT-reinforced CFRP, and SWNT-reinforced CFRP, respectively.
Figure 6B:
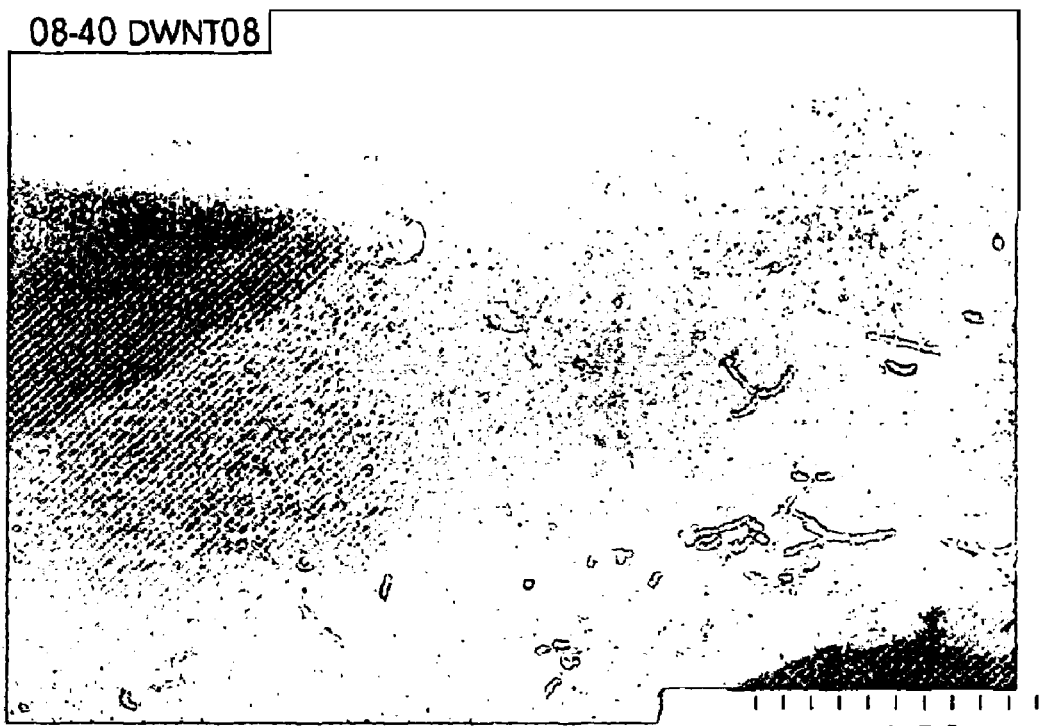
Figure 6C:
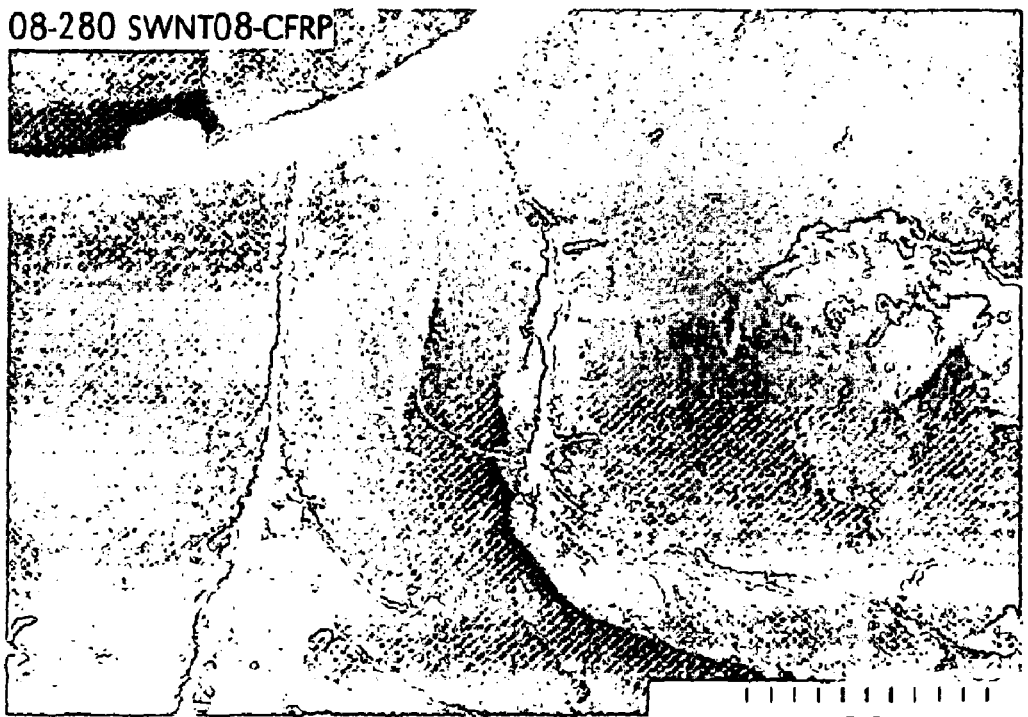

Scannings electron microscopy (SEM) may then be used to check the dispersion of the CNTs in the CFRP samples. As shown in FIGS. 6A-6C, shortened MWNTs, DWNTs, and SWNTs are penetrated and well dispersed inbetween the carbon fibers.

What is claimed is:

1. A composite material carbon nanotubes, a polymer, and carbon fibers, wherein an average length of the carbon nanotubes is less than 2 μm, wherein the carbon nanotubes are impregnated into gaps between individual ones of a weave of the carbon fibers, wherein the weave comprises the carbon fibers oriented in a unidirectional manner to each other, wherein the carbon nanotubes are impregnated into gaps between individual ones of the carbon fibers oriented in the unidirectional manner to each other, wherein the polymer comprises a bisphenol-A epoxy resin, wherein the loading of the carbon nanotubes is 1.0 wt. %.

2. The composite material as recited in claim 1, wherein the carbon nanotubes are not functionalized.

3. The composite material as recited in claim 1, wherein the carbon nanotubes are functionalized to carboxylic functional groups.

4. The composite material as recited in claim 1, wherein the carbon nanotubes are functionalized to amine functional groups.

5. A composite material comprising carbon nanotubes, a polymer, and fibers, wherein the lengths of all of the carbon nanotubes are less than 2 μm, wherein the carbon nanotubes are impregnated into gaps between individual ones of a weave of the fibers, herein the weave comprises the fibers oriented in a unidirectional manner to each other, wherein the carbon nanotubes are impregnated into gaps between indiviual ones of the fibers oriented in the unidirectional manner to each other, wherein the polymer comprises a bisphenol-A epoxy resin, wherein the loading of the carbon nanotubes is 1.0 wt. %.

6. The composite material as recited in claim 5, wherein the fibers are fabric fibers.

7. The composite material as recited in claim 5, wherein the fibers are glass fibers.

8. The composite material as recited in claim 1, wherein the composite material is a carbon fiber reinforced polymer having a flexural strength greater than or equal to 1561 MPa.

9. The composite material as recited in claim 1, wherein the composite material is a carbon fiber reinforced polymer having a flexural modulus greater than or equal to 65.4 GPa.

10. The composite material as recited in claim 5, wherein the composite material is a fiber reinforced polymer having a flexural strength greater than or equal to 1561 MPa.

11. The composite material as recited in claim 5, wherein the composite material is a fiber reinforced polymer having a flexural modulus greater than or equal to 65.4 GPa.

12. The composite material as recited in claim 5, wherein the composite material is a fiber reinforced polymer having a flexural strength greater than or equal to 1561 MPa and a flexural modulus greater than or equal to 65.4 GPa.

13. The composite material as recited in claim 1, wherein the composite material is a carbon fiber reinforced polymer having a flexural strength greater than or equal to 1561 MPa and a flexural modulus greater than or equal to 65.4 GPa.

14. A carbon fiber reinforced polymer pre-preg comprising carbon fibers impregnated with a CNT-reinforced epoxy resin thin film, wherein an average length of the carbon nanotubes (CNT) is less than 2 μm, in a manner so that carbon nanotubes are impregnated into gaps between individual ones of a weave of the carbon fibers, wherein the weave comprises the carbon fibers oriented in a unidirectional manner to each other, wherein the carbon nanotubes are impregnated into gaps between individual ones of the carbon fibers oriented in the unidirectional manner to each other, wherein the polymer comprises a bisphenol-A epoxy resin, wherein the loading of the carbon nanotubes is 1.0 wt. %.

* * * * *